US012529947B2

(12) United States Patent
Sudo

(10) Patent No.: US 12,529,947 B2
(45) Date of Patent: Jan. 20, 2026

(54) LIGHT SOURCE APPARATUS AND PROJECTOR

(71) Applicant: SONY GROUP CORPORATION, Tokyo (JP)

(72) Inventor: Takashi Sudo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 483 days.

(21) Appl. No.: 17/999,740

(22) PCT Filed: May 20, 2021

(86) PCT No.: PCT/JP2021/019106
§ 371 (c)(1),
(2) Date: Nov. 23, 2022

(87) PCT Pub. No.: WO2021/246184
PCT Pub. Date: Dec. 9, 2021

(65) Prior Publication Data
US 2023/0168571 A1 Jun. 1, 2023

(30) Foreign Application Priority Data
Jun. 5, 2020 (JP) .................................. 2020-098794

(51) Int. Cl.
*G03B 21/20* (2006.01)
(52) U.S. Cl.
CPC ....... *G03B 21/204* (2013.01); *G03B 21/2013* (2013.01); *G03B 21/2053* (2013.01); *G03B 21/208* (2013.01)

(58) Field of Classification Search
CPC .............. G03B 21/204; G03B 21/2013; G03B 21/2053; G03B 21/208; G03B 21/2033;
(Continued)

(56) References Cited

U.S. PATENT DOCUMENTS

2012/0154766 A1 6/2012 Choi et al.
2013/0229628 A1* 9/2013 Akiyama ............. G02B 5/0294
353/20
(Continued)

FOREIGN PATENT DOCUMENTS

JP 2015-108758 A 6/2015
JP 2015-176034 A 10/2015
(Continued)

OTHER PUBLICATIONS

International Search Report and Written Opinion of PCT Application No. PCT/JP2021/019106, issued on Aug. 3, 2021, 08 pages of ISRWO.

*Primary Examiner* — Magda Cruz
(74) *Attorney, Agent, or Firm* — CHIP LAW GROUP

(57) ABSTRACT

A light source apparatus according to the present disclosure includes: a plurality of light sources; a plurality of collimator lenses that outputs, as parallel light, divergent light from each of the plurality of light sources; a diffuser plate that diffuses output light from each of the plurality of collimator lenses; a fly-eye lens having a plurality of lens cells, and in which the output light from each of the plurality of collimator lenses enters each of the plurality of lens cells through the diffuser plate; a fluorescence emission section having a phosphor face; and a condenser optical system that condenses output light from each of the plurality of lens cells of the fly-eye lens toward the phosphor face.

7 Claims, 12 Drawing Sheets

(58) Field of Classification Search
CPC ... G03B 21/2066; G03B 21/2073; F21S 2/00; F21V 5/04; F21V 7/30; F21V 9/35; F21V 13/00; H04N 9/31
USPC .......................................................... 353/31
See application file for complete search history.

(56) References Cited

U.S. PATENT DOCUMENTS

| | | | | |
|---|---|---|---|---|
| 2016/0062223 | A1* | 3/2016 | Akiyama | G03B 21/2013 |
| | | | | 353/31 |
| 2016/0241821 | A1* | 8/2016 | Kuroi | H04N 9/3111 |
| 2018/0210329 | A1* | 7/2018 | Sakata | G03B 21/2013 |
| 2019/0331997 | A1* | 10/2019 | Pan | G02B 26/008 |
| 2019/0391474 | A1* | 12/2019 | Akiyama | G03B 21/2013 |
| 2020/0249555 | A1* | 8/2020 | Akiyama | H04N 9/3152 |

FOREIGN PATENT DOCUMENTS

| | | |
|---|---|---|
| JP | 2018-109747 A | 7/2018 |
| JP | 2018-136518 A | 8/2018 |
| WO | 2018/211886 A1 | 11/2018 |

* cited by examiner

[FIG. 1]
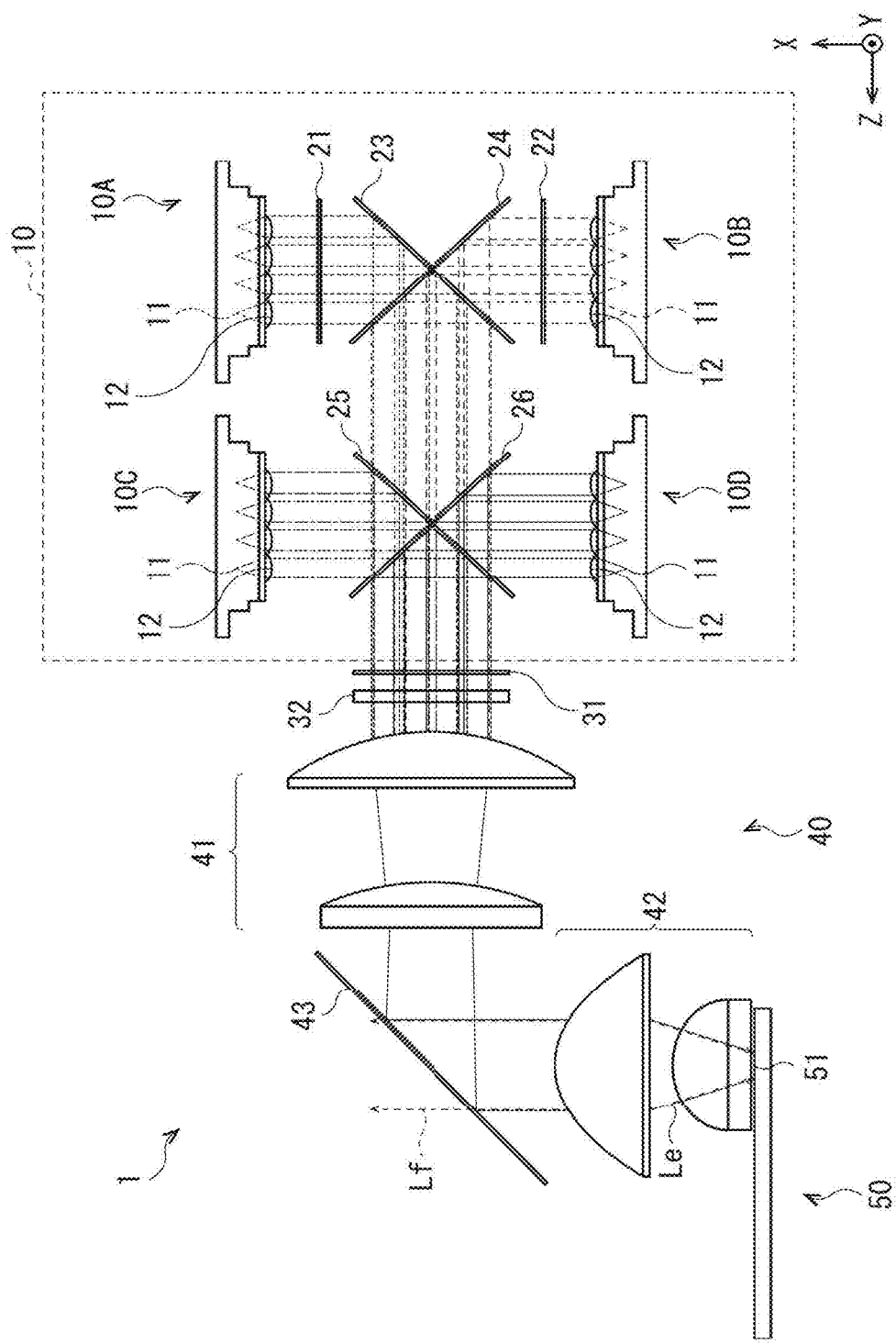

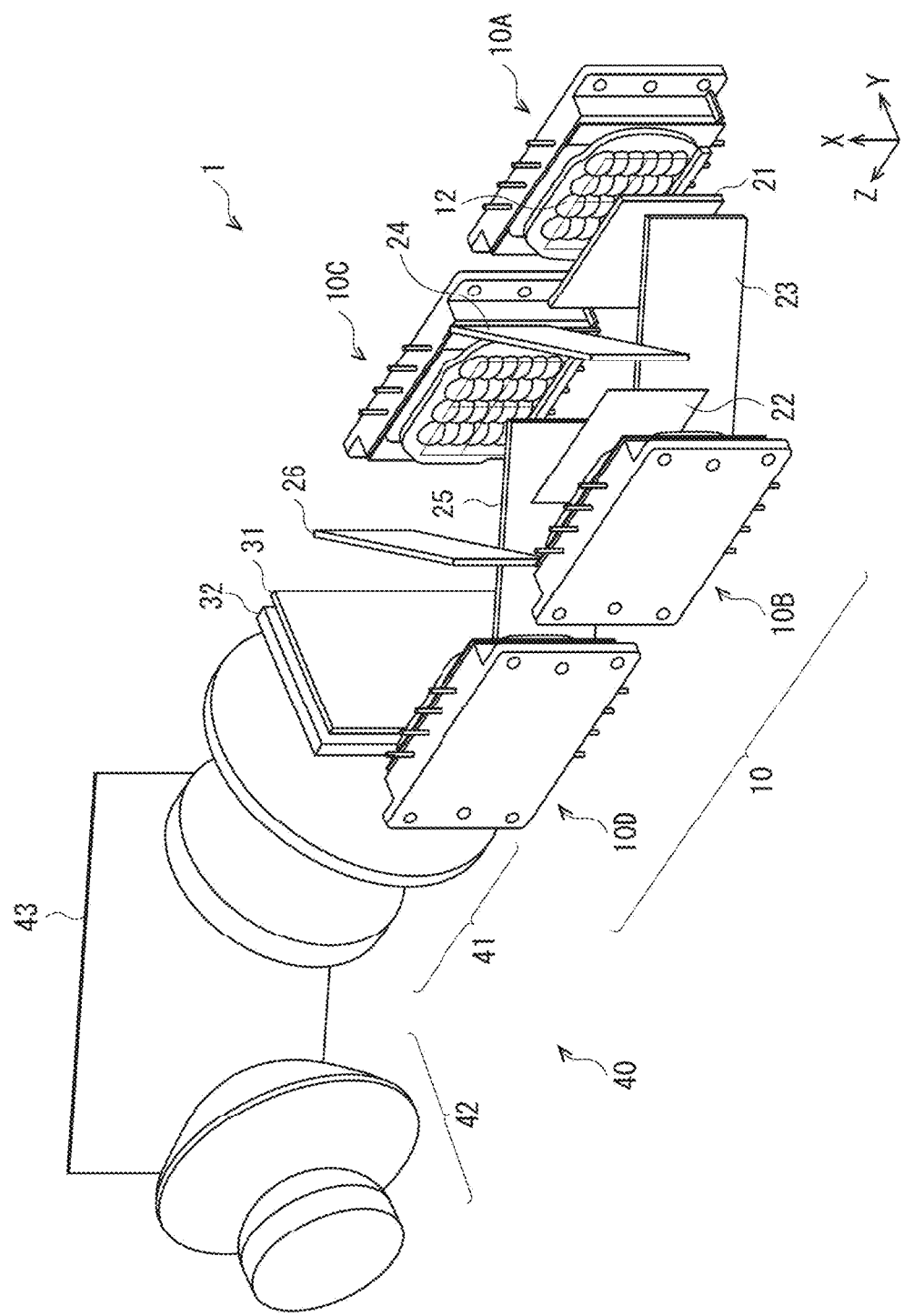
[FIG. 2]

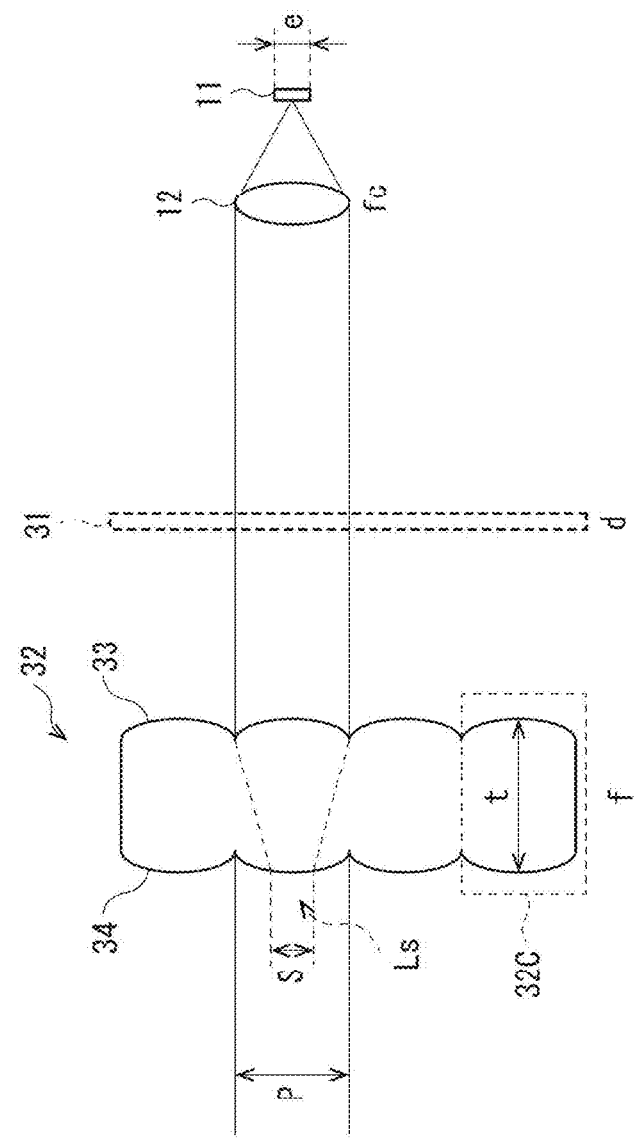
[FIG. 3]

[FIG. 4]
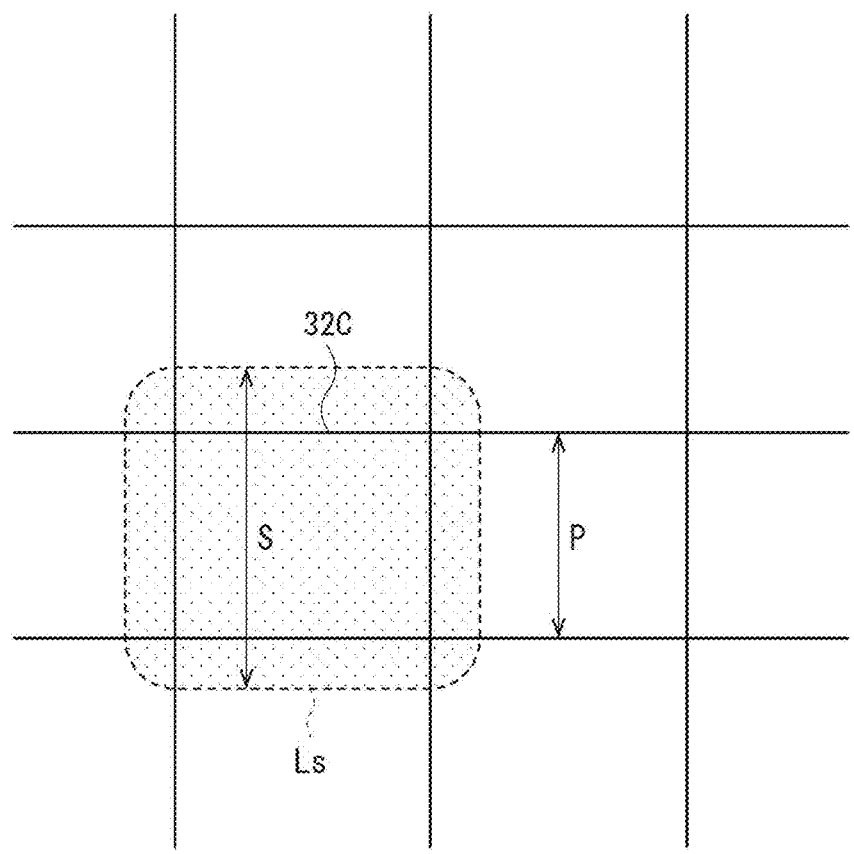

[FIG. 5]
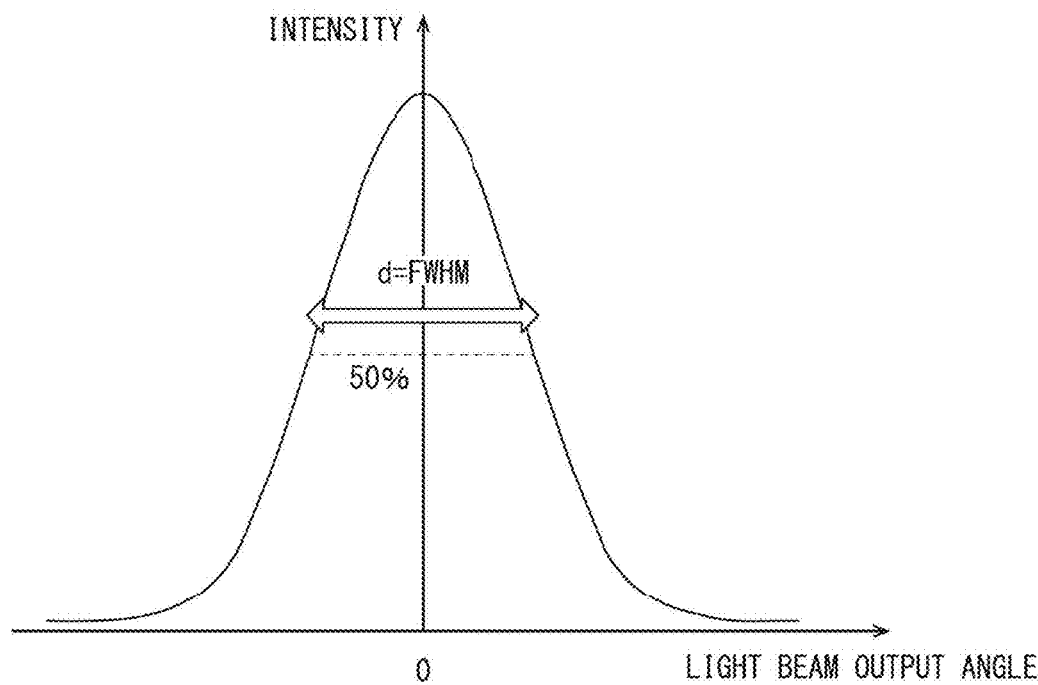
[FIG. 6]
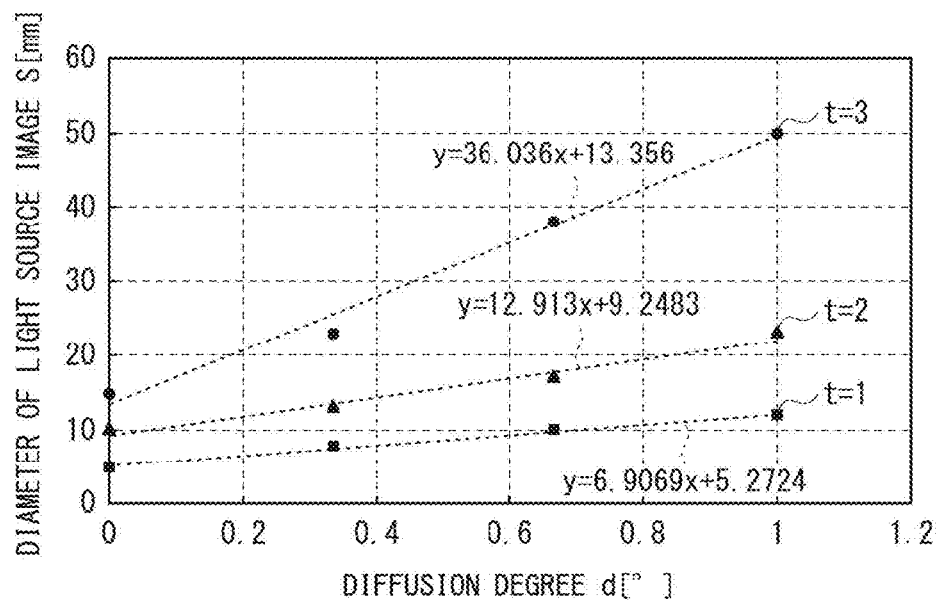

[FIG. 7]
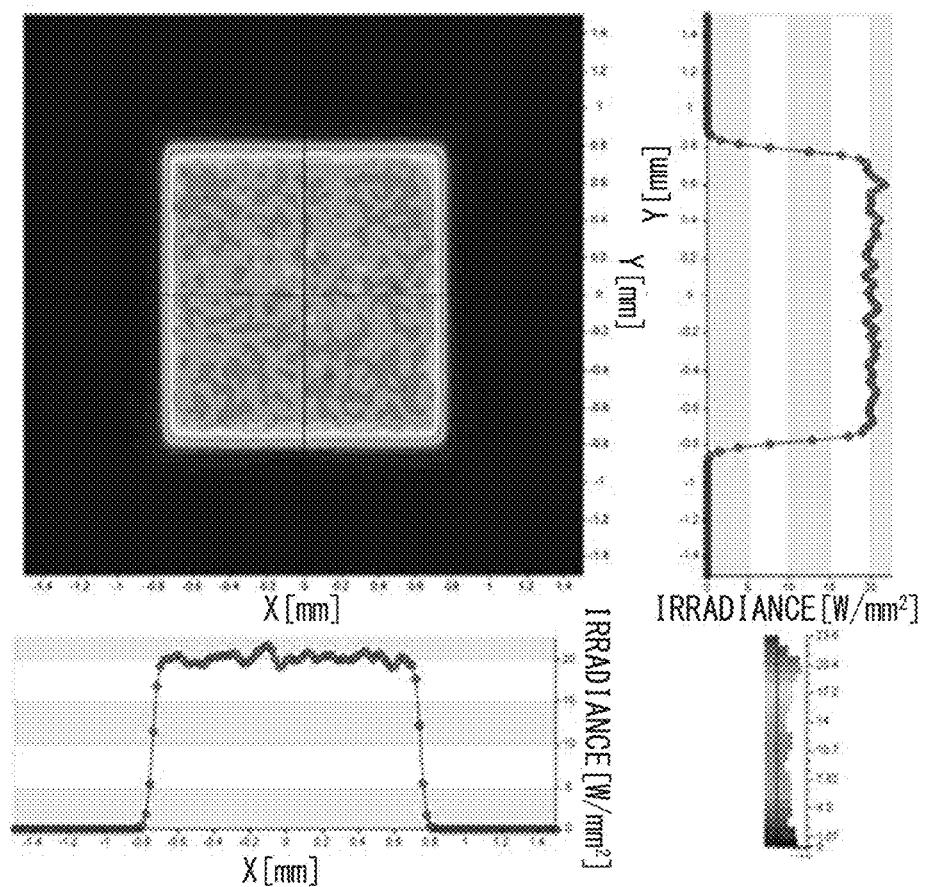

[FIG. 8]
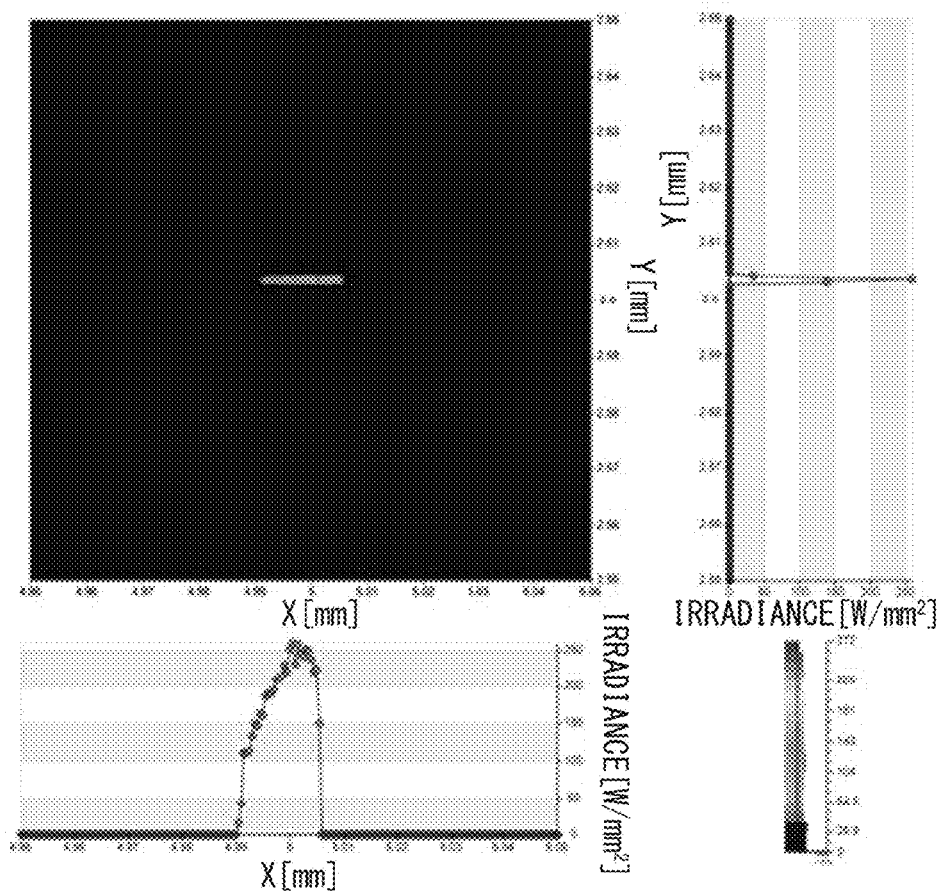

[FIG. 9]
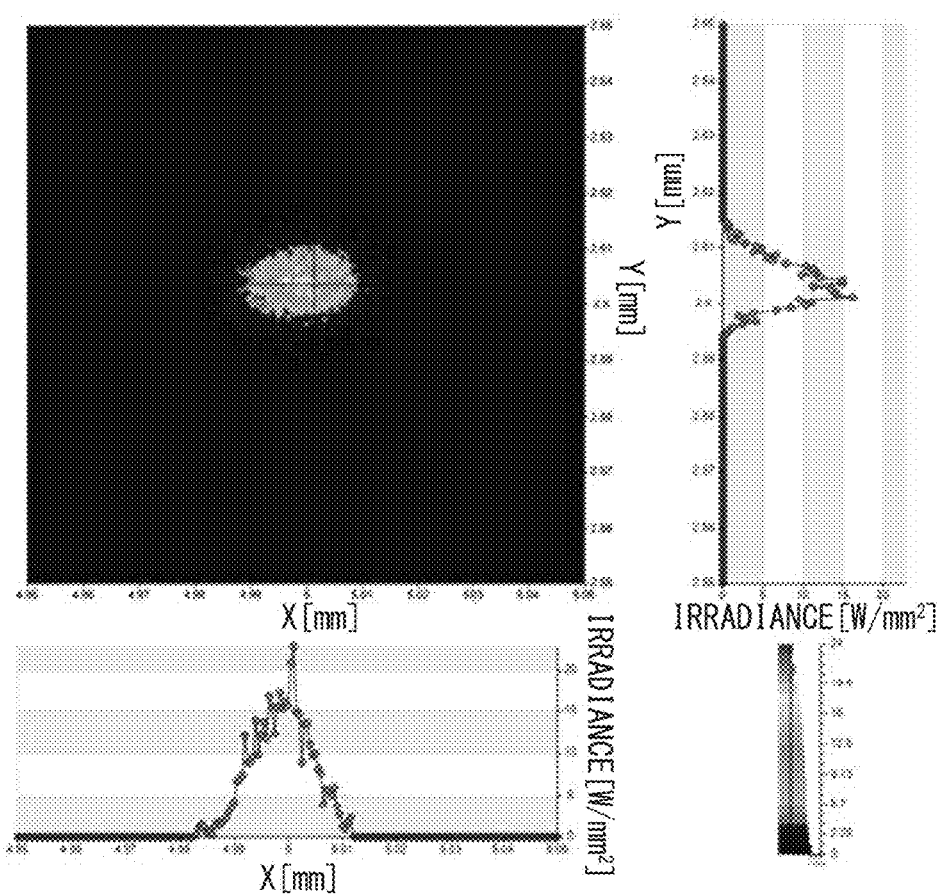

[FIG. 10]
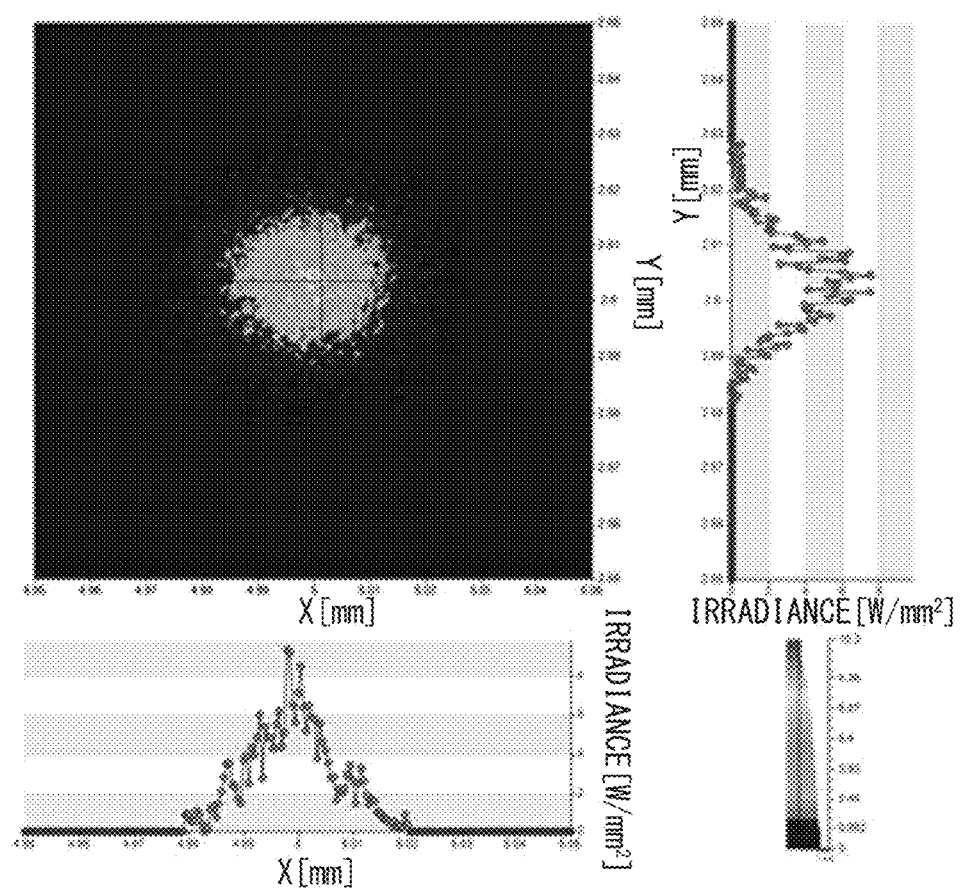

[FIG. 11]
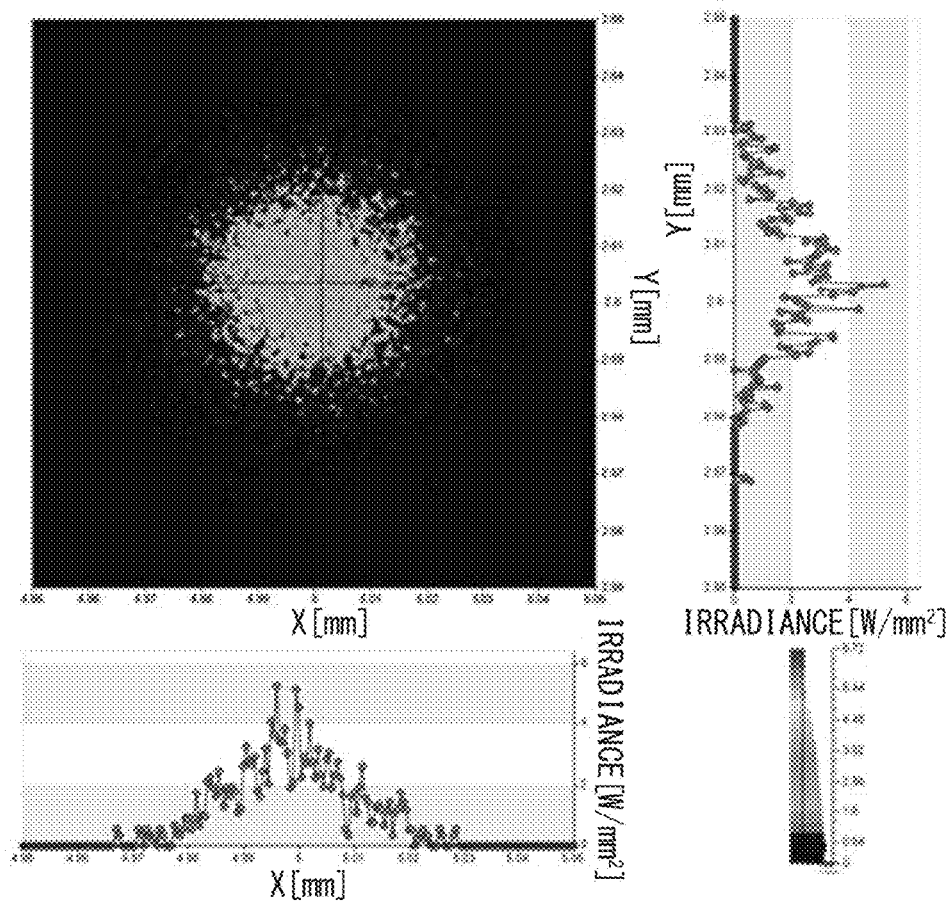

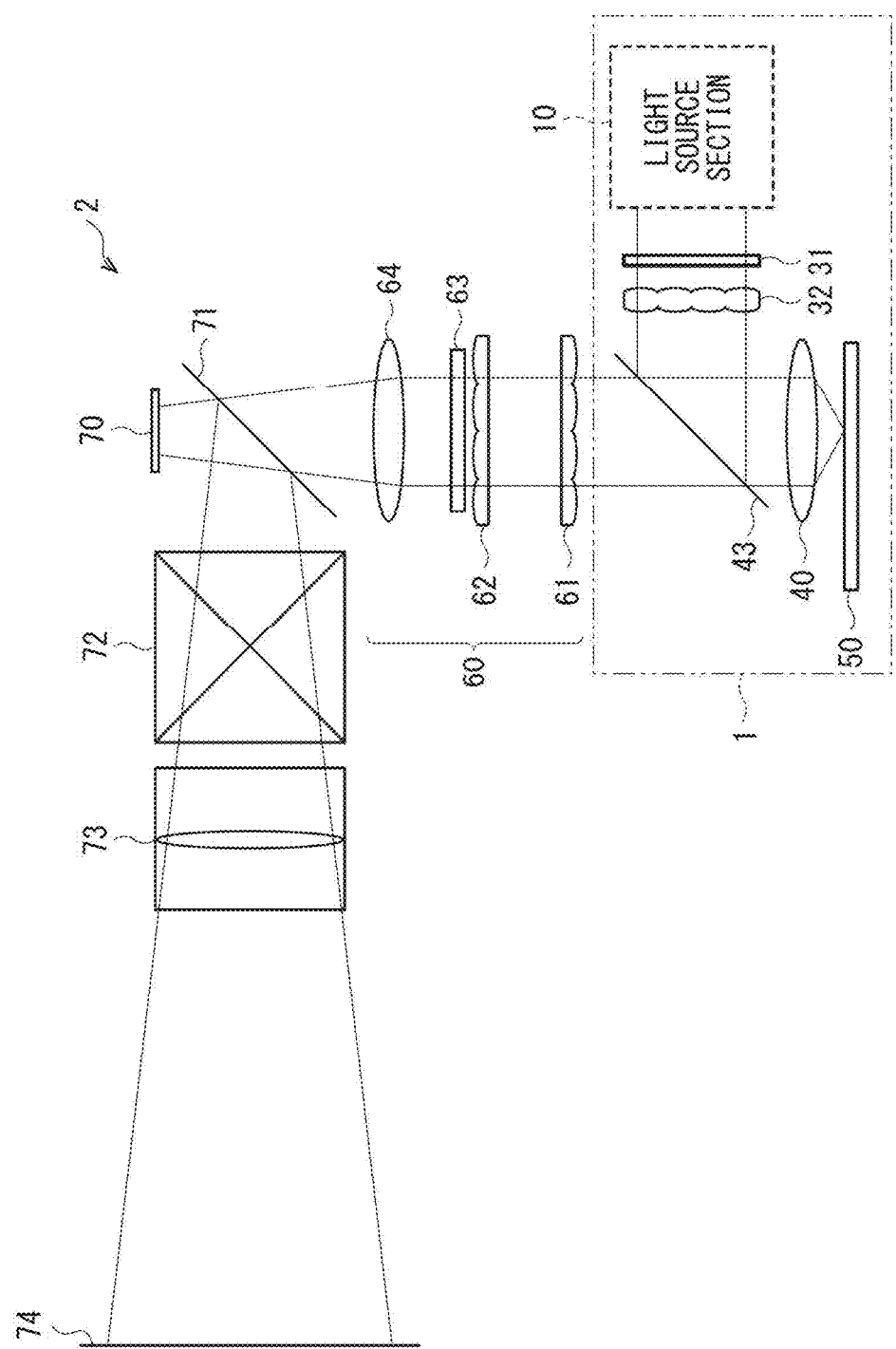
[FIG. 12]

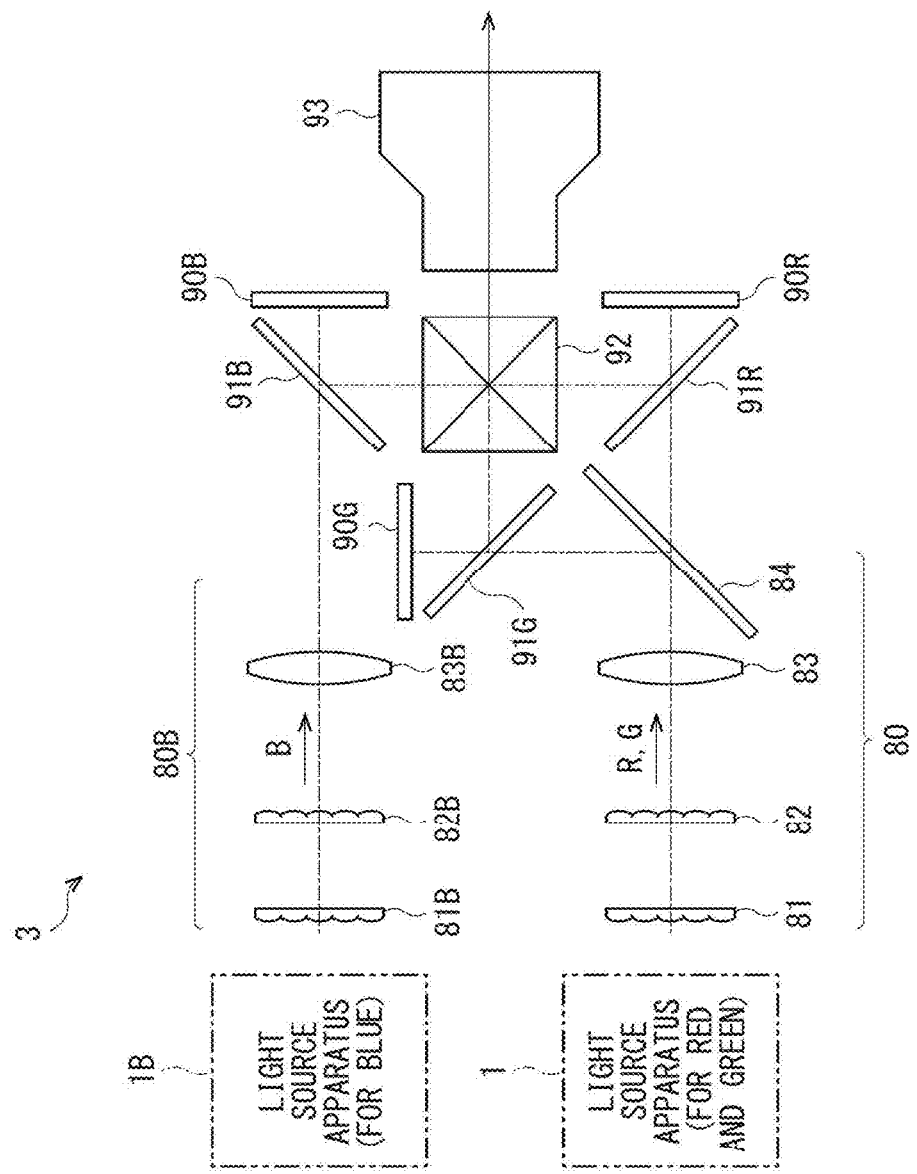
[FIG. 13]

LIGHT SOURCE APPARATUS AND PROJECTOR

CROSS REFERENCE TO RELATED APPLICATIONS

This application is a U.S. National Phase of International Patent Application No. PCT/JP2021/019106 filed on May 20, 2021, which claims priority benefit of Japanese Patent Application No. JP 2020-098794 filed in the Japan Patent Office on Jun. 5, 2020. Each of the above-referenced applications is hereby incorporated herein by reference in its entirety.

TECHNICAL FIELD

The present disclosure relates to a light source apparatus that includes a fly-eye lens, and to a projector.

BACKGROUND ART

A projection display apparatus (a projector) that improves luminance by using a plurality of solid-state light sources has been proposed (see, for example, Patent Literature 1). The projector described in Patent Literature 1 performs shaping of light from a light source apparatus that uses the plurality of solid-state light sources by a pair of fly-eye lenses to thereby generate uniformized illumination light. On the other hand, in a case where a light source apparatus is a phosphor light source of a system in which a phosphor face is irradiated with excitation light from an excitation light source to obtain desired colored light, it is desirable that the phosphor face be irradiated with the excitation light that is uniform and having a high light intensity.

CITATION LIST

Patent Literature

Patent Literature 1: International Publication No. 2018/211886

SUMMARY OF THE INVENTION

In a case where a fly-eye lens is used to obtain excitation light that is uniform and having a high light intensity in a phosphor light source, if a light density on an output face of each of a plurality of lens cells of the fly-eye lens is not properly set, a decrease in luminance efficiency, a decrease in life of the fly-eye lens, or a decrease in reliability of the fly-eye lens is caused.

It is desirable to provide a light source apparatus and a projector that make it possible to achieve both a high reliability and a high luminance efficiency.

A light source apparatus according to one embodiment of the present disclosure includes: a plurality of light sources; a plurality of collimator lenses that outputs, as parallel light, divergent light from each of the plurality of light sources; a diffuser plate that diffuses output light from each of the plurality of collimator lenses; a fly-eye lens having a plurality of lens cells, and in which the output light from each of the plurality of collimator lenses enters each of the plurality of lens cells through the diffuser plate; a fluorescence emission section having a phosphor face; and a condenser optical system that condenses output light from each of the plurality of lens cells of the fly-eye lens toward the phosphor face.

A projector according to one embodiment of the present disclosure includes: a light source apparatus; an illumination optical system that generates illumination light on the basis of light from the light source apparatus; a display panel that generates picture light on the basis of the illumination light generated by the illumination optical system; and a projection optical system that projects, onto a projection face, the picture light generated by the display panel. The light source apparatus is configured by the light source apparatus according to one embodiment of the present disclosure described above.

In the light source apparatus or the projector according to one embodiment of the present disclosure, the divergent light from each of the plurality of light sources enters each of the plurality of lens cells of the fly-eye lens through the plurality of collimator lenses and the diffuser plate. The output light from each of the plurality of lens cells of the fly-eye lens is condensed toward the phosphor face.

BRIEF DESCRIPTION OF THE DRAWINGS

FIG. 1 is a configuration diagram schematically illustrating one configuration example of a light source apparatus according to a first embodiment of the present disclosure.

FIG. 2 is a perspective diagram schematically illustrating one configuration example of the light source apparatus according to the first embodiment.

FIG. 3 is an explanatory diagram relating to a parameter that defines, for example, a size of a light source image in an output face of a micro fly-eye lens in the light source apparatus according to the first embodiment.

FIG. 4 is an explanatory diagram illustrating a relationship between the size of the light source image of the output face of the micro fly-eye lens and a pitch of a micro lens in the light source apparatus according to the first embodiment.

FIG. 5 is an explanatory diagram about a diffusion degree of a diffuser plate in the light source apparatus according to the first embodiment.

FIG. 6 is an explanatory diagram illustrating an example of a relationship between the diffusion degree of the diffuser plate and a diameter of the light source image in the light source apparatus according to the first embodiment.

FIG. 7 is an explanatory diagram illustrating an example of a light intensity distribution of excitation light applied to a phosphor face in the light source apparatus according to the first embodiment.

FIG. 8 is an explanatory diagram illustrating an example of a light intensity distribution of the light source image in the output face of the micro fly-eye lens in a case where the diffusion degree of the diffuser plate is 0° in the light source apparatus according to the first embodiment.

FIG. 9 is an explanatory diagram illustrating an example of a light intensity distribution of the light source image in the output face of the micro fly-eye lens in a case where the diffusion degree of the diffuser plate is 0.3° in the light source apparatus according to the first embodiment.

FIG. 10 is an explanatory diagram illustrating an example of a light intensity distribution of the light source image in the output face of the micro fly-eye lens in a case where the diffusion degree of the diffuser plate is 0.7° in the light source apparatus according to the first embodiment.

FIG. 11 is an explanatory diagram illustrating an example of a light intensity distribution of the light source image in the output face of the micro fly-eye lens in a case where the diffusion degree of the diffuser plate is 1° in the light source apparatus according to the first embodiment.

FIG. 12 is a configuration diagram schematically illustrating a first configuration example of a projector according to a second embodiment.

FIG. 13 is a configuration diagram schematically illustrating a second configuration example of the projector according to the second embodiment.

MODES FOR CARRYING OUT THE INVENTION

In the following, some embodiments of the present disclosure are described in detail with reference to the drawings. It should be noted that the description will be made in the following order.
1. First Embodiment (FIGS. 1 to 11)
 1.1 Configuration of Light Source Apparatus according to First Embodiment
 1.2 Workings and Effects
2. Second Embodiment
 2.1 First Configuration Example of Projector according to Second Embodiment (FIG. 12)
 2.2 Second Configuration Example of Projector according to Second Embodiment (FIG. 13)
 2.3 Modification Examples
3. Other Embodiments

1. First Embodiment

1.1 Configuration of Light Source Apparatus According to First Embodiment (Basic Configuration)

FIG. 1 is a configuration diagram schematically illustrating one configuration example of a light source apparatus 1 according to a first embodiment of the present disclosure. FIG. 2 is a perspective diagram schematically illustrating one configuration example of the light source apparatus 1 according to the first embodiment.

The light source apparatus 1 is suitable, for example, for a light source apparatus of a projector, as described in a second embodiment described later. However, it is possible to apply the light source apparatus 1 according to the first embodiment to an apparatus other than the projector.

The light source apparatus 1 is a phosphor light source, and includes a light source section 10, a diffuser plate 31, a micro fly-eye lens 32, a condenser optical system 40, a dichroic mirror 43, and a phosphor wheel 50.

The phosphor wheel 50 corresponds to one specific example of a "fluorescence emission section" according to a technique of the present disclosure. The micro fly-eye lens 32 corresponds to one specific example of a "fly-eye lens" according to a technique of the present disclosure.

The phosphor wheel 50 has a surface that serves as a phosphor face 51. The phosphor wheel 50 has, for example, a configuration in which a resin in which phosphor particles are dispersed is laminated on a rotatable reflection substrate. The phosphor face 51 emits fluorescent light by being irradiated with excitation light Le. The phosphor face 51 is fluorescently emits yellow light including red light and green light as fluorescence light Lf, for example, by being irradiated with blue light as the excitation light Le. It should be noted that colors of the excitation light Le and the fluorescence light Lf are not limited to those listed here.

The light source section 10 has a plurality of light source units 10A, 10B, 10C, and 10D, a retarder plate 21, a retarder plate 22, a total reflection mirror 23, a total reflection mirror 24, a PBS (polarization separation device) 25, and a PBS 26.

Each of the plurality of light source units 10A, 10B, 10C, and 10D has a plurality of light sources 11 and a plurality of collimator lenses 12. In each of the plurality of light source units 10A, 10B, 10C, and 10D, the plurality of light sources 11 is two-dimensionally arranged. Each of the plurality of collimator lenses 12 is two-dimensionally arranged on a light path of the excitation light Le that is divergent light from each of the plurality of light sources 11.

Here, in FIG. 1, a direction perpendicular to the paper surface is an X-axis direction. Further, in FIG. 1, two directions parallel to the paper surface and orthogonal to each other are a Y-axis direction and a Z-axis direction. The light source unit 10A and the light source unit 10B are positioned to face in the Y-axis direction and are disposed at different positions in the X-axis direction as illustrated in FIG. 2. The retarder plate 21 and the total reflection mirror 23 are disposed on a light path of the excitation light Le from the light source unit 10A. The retarder plate 22 and the total reflection mirror 24 are disposed on a light path of the excitation light Le from the light source unit 10B.

The light source unit 10C and the light source unit 10D are each positioned to face in the Y-axis direction and are disposed at different positions in the X-axis direction as illustrated in FIG. 2. The PBS 25 is disposed on a light path of the excitation light Le reflected by the total reflection mirror 23 and the excitation light Le from the light source unit 10C. The PBS 26 is disposed on a light path of the excitation light Le reflected by the total reflection mirror 24 and the excitation light Le from the light source unit 10D.

The light source 11 is an excitation light source that emits the excitation light Le, and is configured by, for example, LD (a laser diode). The light source 11 emits the excitation light Le of a predetermined polarization direction (e.g., S-polarized light).

In each of the plurality of light source units 10A, 10B, 10C, and 10D, each of the plurality of collimator lenses 12 outputs, as the excitation light Le of parallel light, the excitation light Le that is the divergent light from each of the plurality of light sources 11.

The retarder plate 21 is a half-wave plate, and converts a polarization direction of the excitation light Le from the light source unit 10A (e.g., S-polarized light for the PBS 25) into a polarization direction that is rotated by 90° (e.g., P-polarized light for the PBS 25), and outputs the same toward the total reflection mirror 23. The total reflection mirror 23 reflects the excitation light Le of e.g., the P-polarized light outputted from the retarder plate 21 toward the PBS 25. The PBS 25 reflects the excitation light Le of e.g., the S-polarized light from the light source unit 10C toward the diffuser plate 31. In addition, the PBS 25 causes the excitation light Le from the light source unit 10A, converted into the P-polarized light by the retarder plate 21 and reflected by the total reflection mirror 23, toward the diffuser plate 31.

The retarder plate 22 is a half-wave plate, and converts a polarization direction of the excitation light Le from the light source unit 10B (e.g., S-polarized light for the PBS 26) into a polarization direction that is rotated by 90° (e.g., P-polarized light for the PBS 26), and outputs the same toward the total reflection mirror 24. The total reflection mirror 24 reflects the excitation light Le of e.g., the P-polarized light outputted from the retarder plate 22 toward the PBS 26. The PBS 26 reflects the excitation light Le of e.g., the S-polarized light from the light source unit 10D toward the diffuser plate 31. In addition, the PBS 26 causes the excitation light Le from the light source unit 10B, converted into the P-polarized light by the retarder plate 22 and reflected by the total reflection mirror 24, toward the diffuser plate 31.

The diffuser plate 31 diffuses the excitation light Le that is the output light from the light source section 10, and outputs the same toward the micro fly-eye lens 32.

The micro fly-eye lens 32 has a plurality of lens cells 32C arranged two dimensionally, as illustrated in FIG. 3 to be described later. The micro fly-eye lens 32 is a single optical device in which a plurality of lenses (a micro lens 33 and a micro lens 34) configuring the plurality of lens cells 32C is formed on both faces of the input face and the output face of light. In each of the plurality of lens cells 32C, the micro lens 33 is formed on the input face of light, and the micro lens 34 is formed on the output face of light. In each of the plurality of lens cells 32C, the micro lens 33 and the micro lens 34 configure a pair of coaxially arranged micro lens. A light source image Ls having a diameter S as illustrated in FIG. 3, which will be described later, is formed on an output face of each of the plurality of lens cells 32C of the micro fly-eye lens 32, and is outputted as the excitation light Le from the output face of each of the plurality of lens cells 32C.

The condenser optical system 40 has a condenser lens 41 and a collimator lens 42. The dichroic mirror 43 is disposed on a light path between the condenser lens 41 and the collimator lens 42. The dichroic mirror 43 has characteristics to reflect the excitation light Le (e.g., blue light) and transmit the fluorescence light Lf (e.g., yellow light). The condenser optical system 40 condenses the output light from each of the plurality of lens cells 32C of the micro fly-eye lens 32 toward the phosphor face 51 of the phosphor wheel 50.

The phosphor face 51 emits fluorescent light by being irradiated with the excitation light Le and reflects the fluorescence light Lf toward the dichroic mirror 43. The fluorescence light Lf is transmitted through the dichroic mirror 43 and outputted to the outside.

(Desirable Configuration Example)

FIG. 3 is an explanatory diagram relating to a parameter that defines, for example, a size (the diameter S) of the light source image Ls in the output face of the micro fly-eye lens 32 in the light source apparatus 1.

It should be noted that, in FIG. 3, for the sake of explanation, a configuration of the light source apparatus 1 illustrated in FIGS. 1 and 2 is illustrated in a simplified manner. The diffuser plate 31 diffuses output light from each of the plurality of collimator lenses 12. The output light from each of the plurality of collimator lenses 12 enters each of the plurality of lens cells 32C through the diffuser plate 31. FIG. 3 representatively illustrates only one light source 11 and one collimator lens 12 that correspond to one lens cell 32C in the micro fly-eye lens 32 out of the plurality of light sources 11 and the plurality of collimator lenses 12.

The light source apparatus 1 is a phosphor light source of a method in which the phosphor face 51 is irradiated with the excitation light Le from the plurality of light sources 11 serving as excitation light sources to obtain the fluorescence light Lf of a desired color. In this case, it is desirable that the phosphor face 51 be irradiated with the excitation light Le that is uniform and having a high light intensity. In the light source apparatus 1, although the micro fly-eye lens 32 is used to obtain the excitation light Le that is uniform and having the high light intensity, if a light density on the output face of each of the plurality of lens cells 32C of the micro fly-eye lens 32 is not properly set, a decrease in luminance efficiency, a decrease in life of the micro fly-eye lens 32, or a decrease in reliability of the micro fly-eye lens 32 is caused. As a reason, because a focal distance of lens cell 32C is short, a size of the light source image Ls on the output face is small and the light density becomes very high, causing the lifetime of an optical component to be lowered and the reliability to be decreased. In order to avoid this, if the size of the light source image Ls is made too large, the decrease in luminance efficiency is caused.

Accordingly, it is desirable that the light source apparatus 1 satisfy the following conditional expression (1).

$$0.2 < S/P < 1 \tag{1}$$

Here, S represents a diameter of the light source image Ls of the light source 11 in the output face of the micro fly-eye lens 32, as illustrated in FIG. 3. P indicates a pitch of the lens cell 32C in the output face of the micro fly-eye lens 32.

FIG. 4 is an explanatory diagram illustrating a relationship between the size (the diameter S) of the light source image Ls in the output face of the micro fly-eye lens 32 and the pitch P of the micro lens 34 in the light source apparatus 1. FIG. 4 illustrates a state in which an upper limit of the conditional expression (1) is exceeded. In a case where the upper limit of the conditional expression (1) is exceeded, as illustrated in FIG. 4, the size of the light source image Ls becomes larger than the size of one lens cell 32C, decreasing the luminance efficiency. On the other hand, in a case where it falls below the lower limit of the conditional expression (1), the size of the light source image Ls becomes too small with respect to the size of one lens cell 32C, and the light density in one lens cell 32C becomes very high, lowering the lifetime of an optical component and decreasing the reliability.

The diameter S of the light source image Ls in the conditional expression (1) is expressed by the following expression (2).

$$S = (e \times f/fc) + (a \times d) \tag{2}$$

Here, e represents a light emission diameter (a diameter) of the light source 11 as illustrated in FIG. 3. f represents a focal distance of the lens cell 32C of the micro fly-eye lens 32. fc represents a focal distance of the collimator lens 12. d represents a diffusion degree of the diffuser plate 31. a is a coefficient indicating a change in the diameter S of the light source image Ls in the output face of the micro fly-eye lens 32 versus the diffusion degree d of the diffuser plate 31.

FIG. 5 is an explanatory diagram about the diffusion degree d of the diffuser plate 31 in the light source apparatus 1. In FIG. 5, a horizontal axis represents a light beam output angle, and a vertical axis represents a light intensity. The diffusion degree d of the diffuser plate 31 is spectrum width of a part where the intensity of light outputted from the diffuser plate 31 becomes 50%, that is, the full width at half maximum (FWHM).

FIG. 6 is an explanatory diagram illustrating an example of a relationship between the diffusion degree d of the diffuser plate 31 and the diameter S of the light source image Ls in the light source apparatus 1. In FIG. 6, a horizontal axis represents the diffusion degree d)(° of the diffuser plate 31, and a vertical axis represents the diameter S (mm) of the light source image Ls. As illustrated in FIG. 3, t is a thickness of the lens cell 32C of the micro fly-eye lens 32.

For manufacturing, it is desirable that the thickness t of the lens cell 32C be 1 (mm)≤t≤3 (mm). FIG. 6 illustrates a relationship between the diffusion degree d of the diffuser plate 31 and the diameter S of the light source image Ls in a case where the thickness t of the lens cell 32C is each of 1 (mm), 2 (mm), and 3 (mm). In a case where a vertical axis is y and a horizontal axis is x, a relationship between the diffusion degree d of the diffuser plate 31 and the diameter S of the light source image Ls in each thickness t becomes linear (a linear function) as illustrated in FIG. 6. An inclination of this straight line corresponds to the coefficient a that represents the change in the diameter S of the light source image Ls in the above expression (2).

From a result illustrated in FIG. 6, it is desirable that the coefficient a indicating the change in the diameter S of the light source image Ls satisfy the following conditional expression (3).

$$6 < a < 37 \quad (3)$$

1.2 Workings and Effects

FIG. 7 illustrates an example of a light intensity distribution (a light spot shape) of the excitation light Le applied on the phosphor face 51 in the light source apparatus 1. It should be noted that FIG. 7 also illustrates an irradiance distribution of each of a horizontal direction (X) and a vertical direction (Y) of the light spot. As illustrated in FIG. 7, according to the light source apparatus 1, it is possible to irradiate the phosphor face 51 with the excitation light Le that is uniform and having the high light intensity.

FIGS. 8 to 11 illustrate an example of the light intensity distribution (the light spot shape) of the light source image Ls in the output face of the micro fly-eye lens 32 in a case where the diffusion degree d of the diffuser plate 31 is changed in the light source apparatus 1. FIG. 8 illustrates a case where the diffusion degree d is 0°, FIG. 9 illustrates a case where the diffusion degree d is 0.3°, FIG. 10 illustrates a case where the diffusion degree d is 0.7°, and FIG. 11 illustrates a case where the diffusion degree d is 1°. It should be noted that FIGS. 8 to 11 also illustrate the irradiance distribution in each of the horizontal direction (X) and the vertical direction (Y) of the light spot.

A case where the diffusion degree d of FIG. 8 is 0° corresponds to a case where no diffuser plate 31 is provided. In a case where no diffuser plate 31 is provided, the light density becomes very high as illustrated in FIG. 8. As the diffusion degree d is increased, it is possible to allow the light density to be lowered.

As described above, according to the light source apparatus 1 of the first embodiment, the divergent light of the light source 11 is caused to enter the lens cell 32C of the micro fly-eye lens 32 through the collimator lens 21 and the diffuser plate 31. Accordingly, it is possible to achieve both the high reliability and the high luminance efficiency.

According to the light source apparatus 1 of the first embodiment, it is possible to allow a shape of the light spot on the phosphor face 51 to be a uniform square shape as illustrated in FIG. 7, for example. In addition, as illustrated in FIGS. 9 to 11, it is possible to suppress the light density in the output face of the micro fly-eye lens 32.

It is to be noted that the effects described in the present specification are merely illustrative and not limitative, and there may be other effects. This applies similarly to effects of the other subsequent embodiments.

2. Second Embodiment

Next, a projector according to a second embodiment of the present disclosure will be described. In the following description, the same reference numerals are assigned to parts substantially the same as those in component of the light source apparatus according to the above first embodiment, and description thereof will be omitted as appropriate.

The light source apparatus 1 according to the above first embodiment is suitable, for example, as a light source apparatus of a projector as described below.

2.1 First Configuration Example of Projector According to Second Embodiment

FIG. 12 schematically illustrates a first configuration example of a projector according to the second embodiment.

The projector 2 according to the first configuration example of the second embodiment includes the light source apparatus 1, an illumination optical system 60, a display panel 70, PBF (polarization beam filter) 71, a color composition prism 72, and a projection optical system 73.

It should be noted that, in FIG. 12, only one display panel 70 is illustrated as the display panel for the sake of explanation. In FIG. 12, a configuration other than the components for irradiating one display panel 70 with the illumination light is omitted. The projector 2 may further include another display panel other than the display panel 70 and a component for irradiating the other display panel with the illumination light.

The illumination optical system 60 generates the illumination light on the basis of light from the light source apparatus 1. The illumination optical system 60 has a pair of fly-eye lens 61 and fly-eye lens 62, a PS conversion device (a polarization conversion device) 63, and a condenser lens 64.

The pair of fly-eye lens 61 and fly-eye lens 62 uniformizes the light outputted from the light source apparatus 1. The PS conversion device 63 aligns the output light from the pair of fly-eye lens 61 and fly-eye lens 62 to be P-polarized light for the PBF 71, for example, and outputs the same. The condenser lens 64 condenses the output light from the PS conversion device 63 through the PBF 71 toward the display panel 70.

The PBF 71 has, for example, a property that causes P-polarized light to be transmitted therethrough and reflects S-polarized light. The display panel 70 is configured by, for example, a reflective liquid crystal panel. The display panel 70 generates picture light on the basis of the illumination light generated by the illumination optical system 60.

The picture light generated by the display panel 70 is reflected by the PBF 71 toward the color composition prism 72. The picture light generated by the display panel 70 and reflected by the PBF 71 enters the color composition prism 72. Further, another picture light generated by another unillustrated display panel may enter the color composition prism 72. The color composition prism 72 may combine the picture light generated by the display panel 70 with the other picture light generated by the other display panel.

The picture light generated by the display panel 70 enters the projection optical system 73 through the PBF 71 and the color composition prism 72. The projection optical system 73 projects the picture light generated by the display panel 70 onto a projection face such as a screen 74.

Other configurations, workings, and effects may be substantially similar to those of the light source apparatus 1 according to the above first embodiment.

2.2 Second Configuration Example of Projector According to Second Embodiment FIG. 13 is a configuration example schematically illustrating a second configuration example of a projector according to a second embodiment.

The projector 3 according to the second configuration example of the second embodiment includes the light source apparatus 1, a light source apparatus 1B, an illumination optical system 80, an illumination optical system 80B, a display panel for red 90R, a display panel for green 90G, and a display panel for blue 90B. Each of the display panel for red 90R, the display panel for green 90G, and the display panel for blue 90B is configured by, for example, a reflective liquid crystal panel.

The projector 3 further includes a PBF for red (a polarization beam filter) 91R, a PBF for green 91G, a PBF for blue 91B, a color composition prism 92, and a projection optical system 93.

The light source apparatus 1 outputs yellow light that includes red light and green light. The light source apparatus 1B outputs blue light. The light source apparatus 1B is configured by a blue light source such as LD or LED (Light Emitting Diode).

The illumination optical system 80 includes a pair of fly-eye lens 81 and fly-eye lens 82, a condenser lens 83, and a green reflection dichroic mirror 84.

The pair of fly-eye lens 81 and fly-eye lens 82 uniformizes the light outputted from the light source apparatus 1. The condenser lens 83 condenses the output light from the pair of fly-eye lens 81 and fly-eye lens 82 through the green reflection dichroic mirror 84 and the PBF for green 91G toward the display panel for green 90G. In addition, the condenser lens 83 condenses the output light from the pair of fly-eye lens 81 and fly-eye lens 82 through the green reflection dichroic mirror 84 and the PBF for red 91R toward the display panel for red 90R.

The green reflection dichroic mirror 84 reflects the green light included in the output light from the condenser lens 83 toward the PBF for green 91G. The PBF for green 91G transmits the green light reflected by the green reflection dichroic mirror 84 toward the display panel for green 90G. The display panel for green 90G generates green picture light on the basis of the green illumination light generated by the illumination optical system 80. The green picture light generated by the display panel for green 90G is reflected by the PBF for green 91G toward the color composition prism 92.

In addition, the green reflection dichroic mirror 84 transmits the red light included in the output light from the condenser lens 83 toward the PBF for red 91R. The PBF for red 91R transmits red light transmitted through the green reflection dichroic mirror 84 toward the display panel for red 90R. The display panel for red 90R generates red picture light on the basis of the red illumination light generated by the illumination optical system 80. The red picture light generated by the display panel for red 90R is reflected by the PBF for red 91R toward the color composition prism 92.

The illumination optical system 80B has a pair of fly-eye lens 81B and fly-eye lens 82B, and a condenser lens 83B.

The pair of fly-eye lens 81B and fly-eye lens 82B uniformizes the light outputted from the light source apparatus 1B. The condenser lens 83B condenses the output light from the pair of fly-eye lens 81B and fly-eye lens 82B toward the display panel for blue 90B through the PBF for blue 91B.

The PBF for blue 91B transmits the blue light outputted from the condenser lens 83B toward the display panel for blue 90B. The display panel for blue 90B generates blue picture light on the basis of the blue illumination light generated by the illumination optical system 80B. The blue picture light generated by the display panel for blue 90B is reflected by the PBF for blue 91B toward the color composition prism 92.

The color composition prism 92 combines the red picture light generated by the display panel for red 90R, the green picture light generated by the display panel for green 90G, and the blue picture light generated by the display panel for blue 90B, and outputs the combined pieces of light toward the projection optical system 93.

The picture light generated by the display panel of each color enters, in a synthesized manner, the projection optical system 93 through the PBFs of respective colors and the color composition prism 92. The projection optical system 93 projects the picture light generated by the display panel of each color onto an unillustrated projection face such as a screen.

Other configurations, workings, and effects may be substantially similar to those of the light source apparatus 1 according to the above first embodiment.

2.3 Modification Examples

In FIGS. 12 and 13, a configuration of the projector that uses the reflection display panel is exemplified, but the configuration that uses a transmission display panel may be used. In addition, the number of display panels used may be 2 or 4 or more.

3. Other Embodiments

A technique according to the present disclosure is not limited to the description of each embodiment described above, and various modifications can be made.

For example, the present technology may also have the following configurations.

According to the present technology having the following configurations, the divergent light from each of the plurality of light sources is caused to enter each of the plurality of lens cells 32C of the fly-eye lens through the plurality of collimator lenses and the diffuser plate. Accordingly, it is possible to achieve both the high reliability and the high luminance efficiency.

(1)

A light source apparatus including:

a plurality of light sources;

a plurality of collimator lenses that outputs, as parallel light, divergent light from each of the plurality of light sources;

a diffuser plate that diffuses output light from each of the plurality of collimator lenses;

a fly-eye lens having a plurality of lens cells, and in which the output light from each of the plurality of collimator lenses enters each of the plurality of lens cells through the diffuser plate;

a fluorescence emission section having a phosphor face; and a condenser optical system that condenses output light from each of the plurality of lens cells of the fly-eye lens toward the phosphor face.

(2)

The light source apparatus according to (1), in which the fly-eye lens includes a single optical device in which a plurality of lenses configuring the plurality of lens cells is formed on both faces of an input face of light and an output face of the light.

(3)

The light source apparatus according to (1) or (2), in which the following conditional expression (1) is satisfied:

$$0.2 < S/P < 1 \qquad (1)$$

where S is diameter of a light source image of the light source in an output face of the fly-eye lens, and P is a pitch of the lens cells in the output face of the fly-eye lens.

(4)

The light source apparatus according to (3), in which the diameter S of the light source image is represented by the following expression (2):

$$S=(e\times f/fc)+(a\times d) \quad (2)$$

where e is a light emission diameter (a diameter) of the light source, f is a focal distance of the lens cell of the fly-eye lens, Fc is a focal distance of the collimator lens, a is a coefficient indicating a change in the diameter of the light source image in the output face of the fly-eye lens with respect to a diffusion degree of the diffuser plate, and d is the diffusion degree of the diffuser plate.

(5)

The light source apparatus according to (4), in which, when the diffusion degree of the diffuser plate is a spectrum width of a part where an intensity of light outputted from the diffuser plate becomes 50%, the coefficient a indicating the change in the diameter of the light source image satisfies the following conditional expression (3):

$$6<a<37 \quad (3).$$

(6)

A projector including:
a light source apparatus;
an illumination optical system that generates illumination light on the basis of light from the light source apparatus;
a display panel that generates picture light on the basis of the illumination light generated by the illumination optical system; and
a projection optical system that projects, onto a projection face, the picture light generated by the display panel,
the light source apparatus including
a plurality of light sources,
a plurality of collimator lenses that outputs, as parallel light, divergent light from each of the plurality of light sources,
a diffuser plate that diffuses output light from each of the plurality of collimator lenses,
a fly-eye lens having a plurality of lens cells, and in which the output light from each of the plurality of collimator lenses enters each of the plurality of lens cells through the diffuser plate,
a fluorescence emission section having a phosphor face, and
a condenser optical system that condenses output light from each of the plurality of lens cells of the fly-eye lens toward the phosphor face.

The present application claims the benefit of Japanese Priority Patent Application JP2020-98794 filed with the Japan Patent Office on Jun. 5, 2020, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A light source apparatus, comprising:
a plurality of light sources;
a plurality of collimator lenses configured to collectively output, as parallel light, divergent light from the plurality of light sources;
a diffuser plate configured to diffuse first output light from each collimator lens of the plurality of collimator lenses;
a fly-eye lens comprising a plurality of lens cells, wherein the diffused first output light corresponding to each collimator lens of the plurality of collimator lenses is incident on a corresponding lens cell of the plurality of lens cells;
a fluorescence emitter comprising a phosphor face; and
a condenser optical system configured to condense second output light from each lens cell of the plurality of lens cells of the fly-eye lens toward the phosphor face.

2. The light source apparatus according to claim 1, wherein
the plurality of lens cells of the fly-eye lens defines a single optical device,
the single optical device includes a plurality of lenses an input face of the single optical device and an output face of the single optical device,
the diffused first output light, corresponding to each collimator lens of the plurality of collimator lenses, is incident on the input face of the single optical device, and
the second output light, corresponding to each lens cell of the plurality of lens cells, is emergent from the output face of the single optical device.

3. The light source apparatus according to claim 1, wherein a diameter S of a light source image of at least one light source of the plurality of light sources in an output face of the fly-eye lens, and a pitch P of at least one lens cell of the plurality of lens cells in the output face of the fly-eye lens satisfy conditional expression given by:

$$0.2<S/P<1.$$

4. The light source apparatus according to claim 3, wherein the diameter S of the light source image of the at least one light source is given by:

$$S=(e\times f/fc)+(a\times d)$$

where e is a light emission diameter of the at least one light source, f is a focal distance of the at least one lens cell of the fly-eye lens, fc is a focal distance of a corresponding collimator lens of the plurality of collimator lenses,
a is a coefficient indicating a change in the diameter of the light source image in the output face of the fly-eye lens with respect to a diffusion degree of the diffuser plate, and
d is the diffusion degree of the diffuser plate.

5. The light source apparatus according to claim 4, wherein in a case where the diffusion degree of the diffuser plate is a spectrum width of a part where an intensity of light outputted from the diffuser plate becomes half, the coefficient a has a value greater than 6 and less than 37.

6. A projector, comprising:
a light source apparatus configured to emit source light;
an illumination optical system configured to generate illumination light based on the source light from the light source apparatus;
a display panel configured to generate picture light based on the illumination light; and
a projection optical system configured to project the picture light onto a projection face, wherein
the light source apparatus includes:
a plurality of light sources;

a plurality of collimator lenses configured to collectively output, as parallel light, divergent light from the plurality of light sources;

a diffuser plate configured to diffuse first output light from each collimator lens of the plurality of collimator lenses;

a fly-eye lens comprising a plurality of lens cells, wherein the diffused first output light corresponding to each collimator lens of the plurality of collimator lenses is incident on a corresponding lens cell of the plurality of lens cells;

a fluorescence emitter comprising a phosphor face; and a condenser optical system configured to condense second output light from each lens cell of the plurality of lens cells of the fly-eye lens toward the phosphor face.

7. A light source apparatus, comprising:

a plurality of light sources;

a plurality of collimator lenses configured to configured to collectively output, as parallel light, divergent light from the plurality of light sources;

a diffuser plate configured to diffuse first output light from each collimator lens of the plurality of collimator lenses;

a fly-eye lens comprising a plurality of lens cells, wherein the diffused first output light corresponding to each collimator lens of the plurality of collimator lenses is incident on a corresponding lens cell of the plurality of lens cells, and a diameter S of a light source image of at least one light source of the plurality of light sources in an output face of the fly-eye lens, and a pitch P of at least one lens cell of the plurality of lens cells in the output face of the fly-eye lens satisfy a conditional expression: $0.2<S/P<1$;

a fluorescence emitter comprising a phosphor face; and a condenser optical system configured to condense second output light from each lens cell of the plurality of lens cells of the fly-eye lens toward the phosphor face.

* * * * *